United States Patent [19]

Stroklund

[11] Patent Number: 4,570,375
[45] Date of Patent: Feb. 18, 1986

[54] WILD GAME TRAP

[76] Inventor: Jerald K. Stroklund, R.R. 3, Minot, N. Dak. 58701

[21] Appl. No.: 463,927

[22] Filed: Feb. 4, 1983

[51] Int. Cl.⁴ .......................................... A01M 23/26
[52] U.S. Cl. ........................................ 43/85; 43/90
[58] Field of Search ................. 43/85, 81, 77, 88, 90

[56] References Cited

U.S. PATENT DOCUMENTS

| 390,021 | 9/1888 | Hooker | 43/85 |
| 1,305,588 | 6/1919 | Cherep | 43/88 |
| 1,382,298 | 6/1921 | Lonk | 43/90 |
| 1,497,816 | 6/1924 | Welbourn | 43/92 |
| 1,665,020 | 4/1928 | Catlin | 43/82 |
| 2,723,486 | 11/1955 | Bouma | 43/85 |
| 3,396,486 | 8/1968 | Dohms | 43/90 |
| 3,760,530 | 9/1973 | Dahlgren | 43/88 |
| 4,005,542 | 2/1977 | Anderson | 43/85 |
| 4,257,184 | 3/1981 | Malone | 43/92 |
| 4,279,093 | 7/1981 | Iddings | 43/85 |

*Primary Examiner*—Gene P. Crosby
*Attorney, Agent, or Firm*—Harvey B. Jacobson

[57] ABSTRACT

A wild game trap including two multiangulated trap arms having an eye at one end mounted for rotation about a common pivot bolt and a power spring including a lower spring arm terminating in an eye mounted on the pivot bolt and an upper spring arm terminating in a constriction bar in the form of a loop receiving the pivot eyes, the pivot bolt and a portion of each of the multiangulated trap arms when they are pivoted to an animal gripping position. A trigger assembly is provided for retaining the multiangulated trap arms in open position when the trap is set. In one embodiment of the trigger assembly, a rolling block is mounted on one trap arm and a lock is pivotally connected to the lower spring arm for engagement with a catch on the trap arm. In another embodiment of the trigger assembly, the lock is mounted on the spring arm by a one-piece resilient bracket. In a further embodiment of the trigger assembly, the lock is pivoted to a hinge bracket and includes a curved member overlying one of the trap arms and engaging a catch on the rolling block on the trap arm. In all embodiments, the trigger assembly releases the trap from its set position in response to movement of a trigger in any of four directions.

13 Claims, 17 Drawing Figures

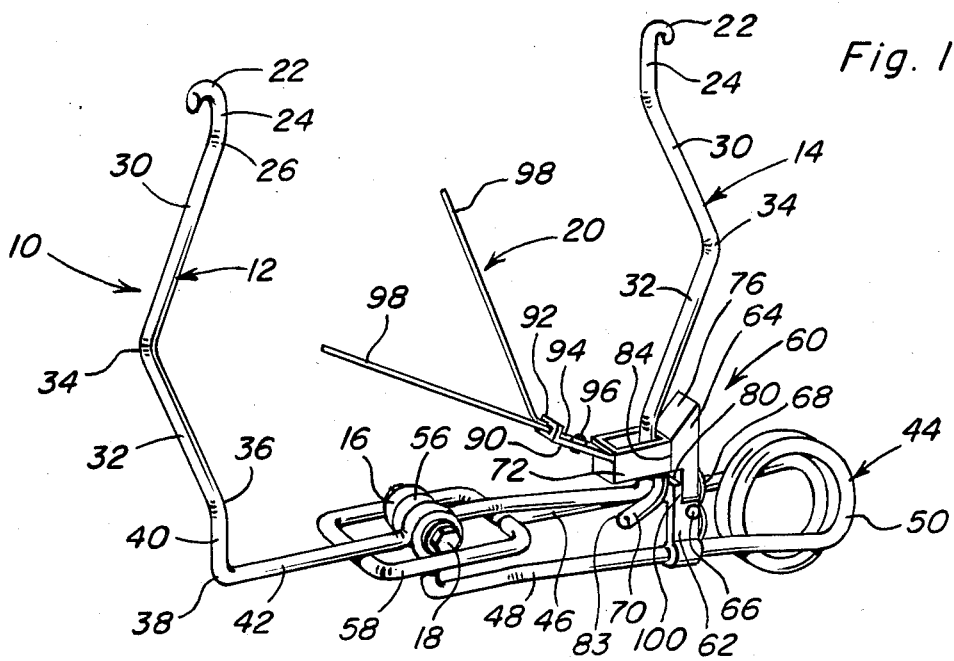
Fig. 1
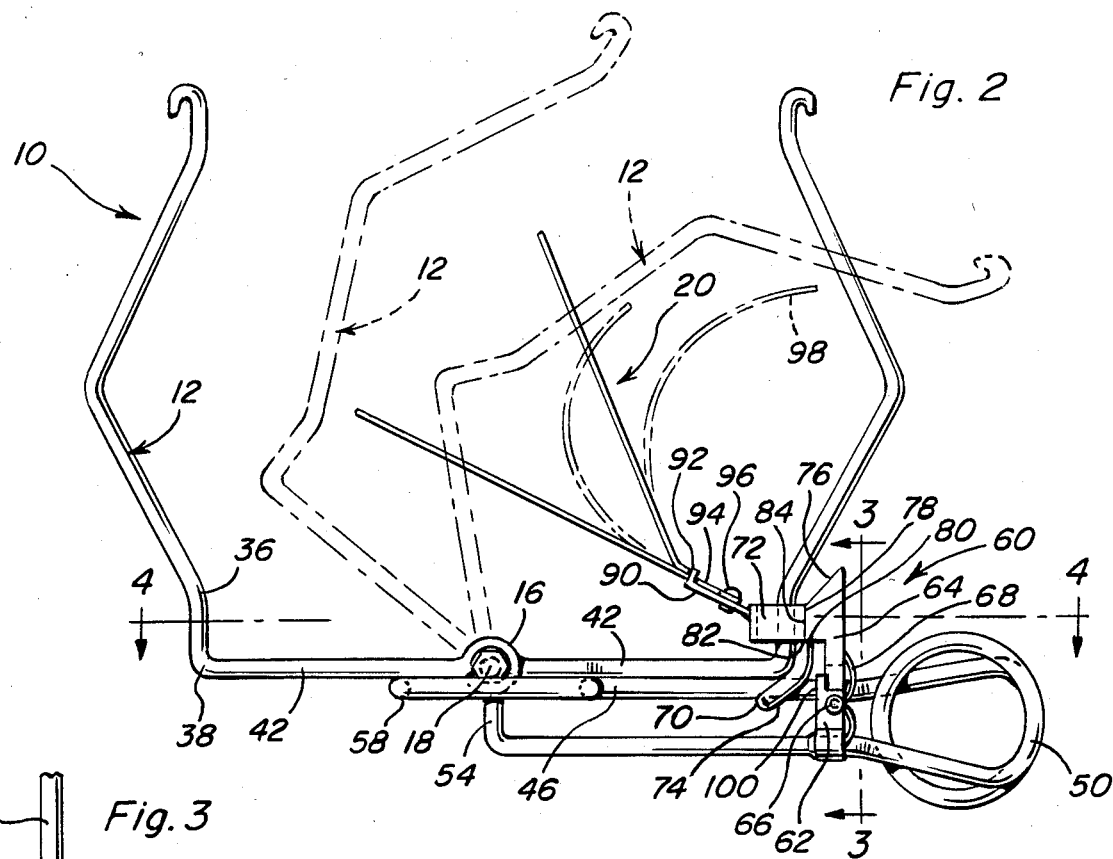
Fig. 2
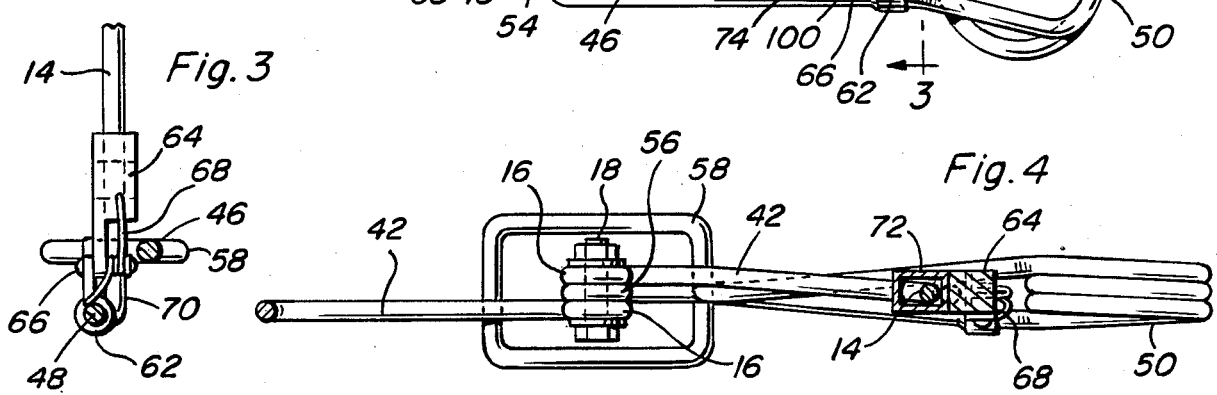
Fig. 3
Fig. 4

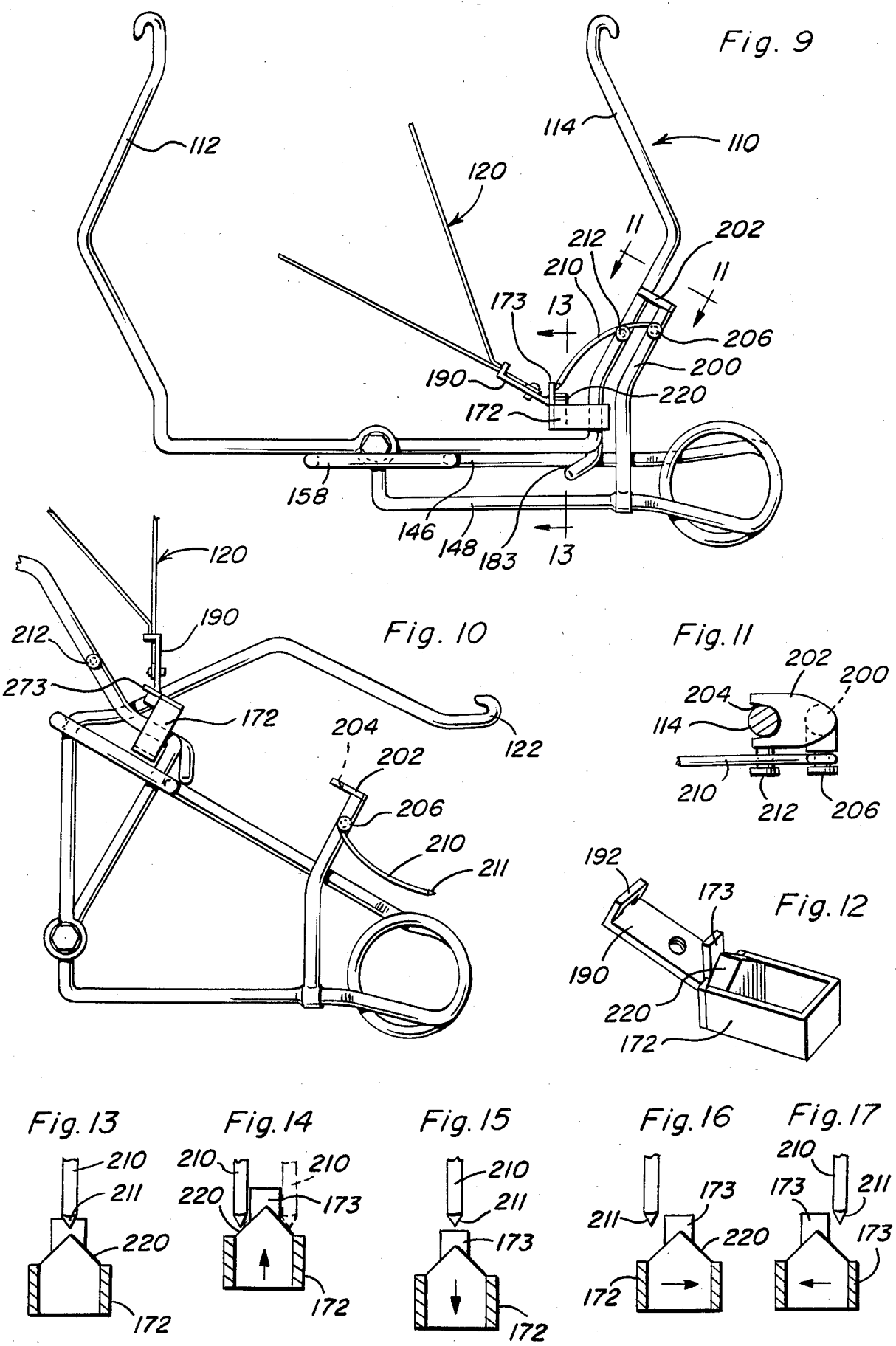

WILD GAME TRAP

BACKGROUND OF THE INVENTION

1. Field of the Invention

The present invention relates to a wild game animal trap having at least two multiangulated trap arms providing various contours for constriction of game animals being trapped, and more particularly the invention relates to a trap that releases from set position in response to a four way trigger that provides optimum sensitivity in response to presence of a game animal.

The wild game trap of the present invention is directed to a three bar, five sided constriction mechanism causing quicker death and better securement of the game animal than other known trap devices, and particularly the wild game trap of the present invention provides application of pressure circumferentially around the animal rather than applying pressures basically on two sides of the animal. The trap has no working parts acting against a ground plane, nor do the jaws react against or on the ground, and it is another feature of the invention to provide a triggering arrangement that is side mounted on the animal trap so that it does not engage with natural elements or debris.

The invention is also directed to providing a structure in which the trap size is adjustable from a wide open arrangement of trap arms to a semi-closed position of the trap arms so that the animal trap of the invention is adaptable to trap various animals.

The side mounted trigger mechanism of the present invention maintains the trigger free from debris and other natural elements as opposed to top mounted triggers in which the animal must go under the trigger to enter the trap or a bottom mounted trigger in which the trigger is more susceptible to elements and debris. The trigger, in one embodiment, includes an automatic catch for reloading and thus provides ease and agility in setting the trap in the field. The trap can be set easily by hand without being hazardous to any parts or limbs of the trapper.

2. Description of the Prior Art

Various U.S. patents exemplary of the prior art are: U.S. Pat. No. 1,107,123, W. J. Webster et al.; U.S. Pat. No. 1,497,816, W. A. Welbourn; U.S. Pat. No. 1,665,020, W. Catlin; U.S. Pat. No. 3,396,486, O. P. Dohms et al.; U.S. Pat. No. 3,760,530, W. L. Dahlgren; U.S. Pat. No. 4,257,184, R. P. Malone.

The patent to Webster et al. discloses a spring trap including tread members such that when the trap is sprung, then a ring retains the jaws in closed position. The patent to Catlin discloses an animal trap actuated by a coil spring in which jaws are provided to grasp the animal. The patent to Dohms et al discloses another animal trap having a spring, a trigger plate, and jaws, for grasping an animal with bias of a spring retaining the jaws applied to the animal. The patent to Welbourn discloses a trap having a latch or bar which is prevented from lifting, but, upon sufficient weight on the pan, the bar is released causing the jaws to fly toward each other to clamp the animal therebetween and the legs of the spring loosely encircle and lock the lower portions of the jaws together so that the spreading movement of the legs of the spring are limited by the heel portions of the jaws. None of the patents discloses specific details of all of the elements of this invention in such a way as to bear upon the patentability of any claims to this invention.

SUMMARY OF THE INVENTION

An object and advantage of the present invention is to provide a trap having a multidrection responsive trigger and multiangulated trap arms that are operable to entrap various sizes of game animals.

Another object of the present invention is to provide trap arms, a trigger mechanism and a spring arrangement all cooperable to provide a unique and improved wild game trap.

A further object of the present invention is to provide multiangulated arms used in an animal trap for applying a peripheral constriction force to the animal which will adequately squeeze and securely hold the animal. The trap provides a right angulated constriction element and a left angulated constriction element together with a spring actuated constriction bar acting upon each of the left and right constriction elements. The constriction area is adaptable to either large or small game due to the unique construction of the multiangulated trap arms forming the jaws of the wild game trap. The trap arms are constructed and arranged to overlap and cross over one another and thus preclude or stop the otherwise side-to-side jaw separation which could allow an animal to escape.

An additional object of the present invention is to provide a trigger arrangement that reacts to the animal being present between the jaws of the trap which is side mounted along the trap arm, and which is easily and quickly reset. The trigger arrangement includes a rolling block and lock that engages a catch with the trigger being easily displaced in any of several directions so that the lock cannot be precluded from release from the catch. Thus the lock is essentially displaceable from the catch in any of the directions about a point.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of one embodiment of the wild game trap according to the present invention.

FIG. 2 is a front elevational view thereof showing various positions of a left trap arm.

FIG. 3 is a sectional view taken along section line 3—3 of FIG. 2.

FIG. 4 is a sectional view taken along section line 4—4 of FIG. 2.

FIG. 9 is a front elevational view of another embodiment of the trap in set position.

FIG. 10 is an elevational view of the trap of FIG. 9 in closed position.

FIG. 11 is a sectional view taken along section line 11—11 of FIG. 9.

FIG. 12 is a perspective view of a rolling block and pan of the triggering mechanism.

FIG. 13 is a sectional view taken along section line 13—13 of FIG. 9.

FIGS. 14–17 are views similar to FIG. 13 which show how the catch on the rolling block releases the lock in any of four directions of movement.

DESCRIPTION OF THE PREFERRED EMBODIMENT

Figure 5:
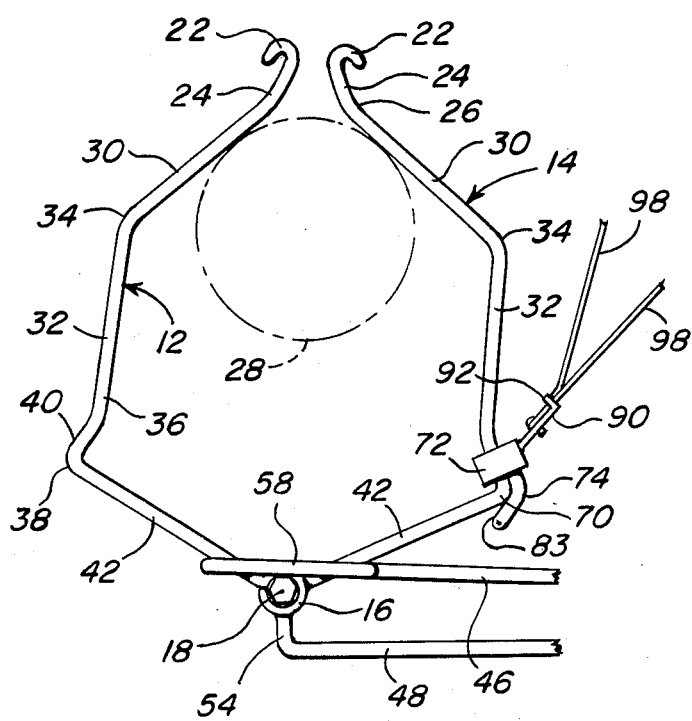
FIGS. 5-7 are fragmental elevational views which show various states of closure of the jaws formed by trap arms of the wild game trap.

Referring now to FIGS. 1–7 of the drawings there is shown a wild game animal trap 10 consisting of two multiangulated jaws or trap arms 12, 14 and each mounted by an eye 16 for rotation about a common pivot bolt 18 including a head, a washer received on the bolt after the trap arms are received on the bolt, and secured with a nut to hold the assembly together and apply friction to the eyes 16 for a purpose set forth hereinafter.

FIG. 1 shows the animal trap 10 in a set position and with the arms 12, 14 open and staged for entrapment of an animal that may actuate a trigger 20. FIG. 2 illustrates that the unlocked trap arm 12 may be adjusted by pivoting about bolt 18 to any of the positions shown by broken lines to provide a trap of desired width with the bolt 18 providing sufficient friction to hold arm 12 in adjusted position but not enough to adversely affect operation of the trap. The trap 10 is shown ranging from a wide open trap to a semi-closed trap. For the smaller trap widths, the trigger 20 can be bent to fit the space defined between the trap arms 12, 14.

Each of the trap arms 12, 14 are constructed of rigid metal wire components and each may be a mirror image of the other. One end of each trap arm has an eye 16, and the other or free end of each arm terminates in a reversely bent end 22 connected to a generally straight portion 24 extending to a shallow bend 26. A generally straight portion 30 is connected to a generally straight section 32 extending between a bend 34 to a bend 36, and between the bend 36 and a right angle bend 38 is a short straight section 40 and extending from the bend 38 is a long, locking or power bar 42 which is a generally straight section terminating in eye 16.

A spring assembly 44 provides a closing force to the arms 12 and 14 and includes an upper arm 46 and a lower arm 48 interconnected by a multiconvolution spring assembly 50. The free end of the lower arm 48 includes an upturned end 54 terminating in an eye 56 mounted on bolt 18. The upper arm 46 terminates in a loop 58 capable of receiving the eyes and bolt and exert a force on arms 12 and 14.

The top bends 22, 26, 34 perform to enable the animal trap 10 to climb up and over animals 28 even a bit higher than the jaws themselves, after an initial grasping of the animal has been accomplished by the trap 10. The trap has an open top to allow animals to pass freely into the wide space between the trap arms 12, 14. The trap size is adjustable as described, from a wide open to a semi-closed position, whatever a trapper's desired width may be. The trap size that may take a beaver, could also take a weasel because of the performance of the multiangulated trap arms 12, 14.

When the trap is in a closed position, the jaws formed by the trap arms 12, 14 cross over one another, thus eliminatng the otherwise possible side-to-side jaw separation which would allow an animal to escape without such cross over.

The loop 58 is constructed of rigid metal wire or bar stock and the loop 58 may be circular in configuration, oval, oblong, square, or rectangular as shown. The loop 58 is connected at an end of the upper spring arm 46 extending from a double turned or wrapped spring 50 of a construction, heft, and strength to be in proportion with the size of trap to be used and the animal to be trapped.

Figure 6:
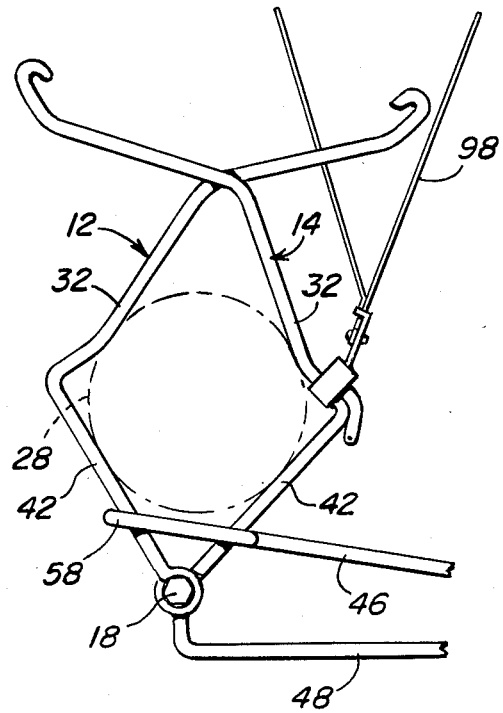
Figure 7:
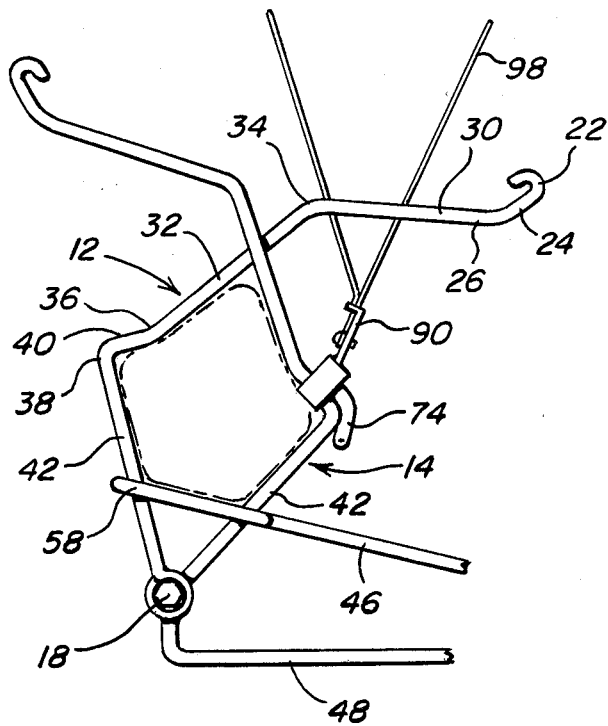

The loop 58 has widely spaced end portions engaging under the straight sections 42 or only the section 42 on trap arm 14 if arm 12 is partially closed. When the trigger 20 is actuated, the arms 12 and 14 close due to the upward force exterted by loop 58 as it moves upwardly and becomes a lower constriction bar as shown in FIGS. 6 and 7.

The animal trap 10 has a side-mounted trigger assembly 60 to which trigger 20 is connected and includes a hinging bracket 62 supportably mounted on the lower spring arm 48 and a lock 64 secured to an upper end of the bracket 62 by a hinge pin 66. A small spring 68 provides small forward pressure on the lock 64, toward the left in FIGS. 1–3, and a catch 70 firmly secured onto a portion of the trap arm 14 proximate the bend 38 such as by welding is engaged by the lock 64. A hollow rolling block 72 is mounted on the trap arm 14 which passes through the hollow interior thereof and supported from an edge of the rolling block 72 is a pan which supports the trigger 20.

The catch 70 has a slide surface 74 disposed at an angle for sliding engagement with an inclined slide surface 76 and a vertical slide surface 78 on lock 64 such that the surface 74 engages surfaces 76 and 78 to cam the lock outwardly when the arm 14 is pivoted toward spring 50. A recessed horizontal surface 80 on lock 64 is adaptable to hook over the top edge 82 of the catch 70 for securing and holding the arm 14 in a loaded or set position. The rolling block 72 loosely fits around the trap arm 14 and the peripheral surface 84 proximate the lock 64 engages with the vertical surface 78 of the lock 64 when the trap and trigger assembly 60 are in the set position. Thus that portion of the rolling block 72 is tightly interfitted between the adjacent portion of the trap arm 14 and the vertical surface 78 on the lock 64, and the associated relationship is maintained by the application of pressure or bias by the spring 68.

Applying pressure on the trigger 20 of the assembly 60 in any general direction, whether up or down, forward or backward, or to the right or left, or any combination of these, forces the rolling block 72 to turn or rotate loosely on the trap arm 14, causing the mutually engaging surfaces 80 on the lock 64 and the top edge 82 of the catch to become disengaged. Movement of the rolling block 72 in any pivotal direction will push the lock 64 toward the right so that the recessed surface 80 is disengaged from the mutually engaging top edge 82 of the catch 70 to allow the trap arms 12, 14, which are under pressure as described below, to be released.

Figure 8:
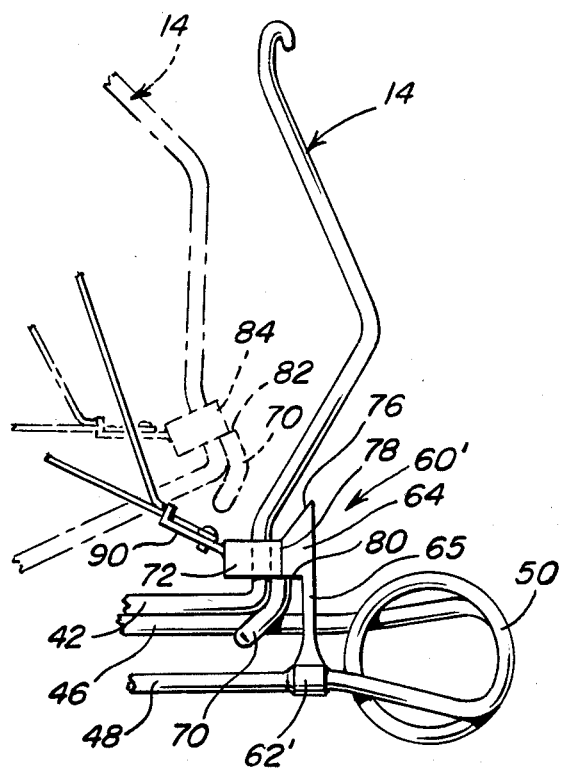
FIG. 8 is a fragmentary front elevational view of another embodiment of the trigger assembly.

FIG. 8 illustrates a slightly modified trigger assembly 60' in which the bracket 62' is of unitary construction with the lock 64 and is made of spring steel having sufficient flexibility in the area 65 to function in the same manner as the hinge pin 66 and spring 68 in FIG. 2. All of the other components function in the same manner and have the same reference numerals.

The trigger 20 is constructed or arranged for general horizontal travel or movement on a pan 90 rigid with rolling block 72 but it has no vertical travel on the pan 90. The pan 90 has a generally flat surface extending from the rolling block 72 throughout the entire pan to a lateral flange 92 having upstanding ends or side edges connected with respective corners of the pan 90 and providing a slot receiving the trigger and providing limited horizontal movement of a trigger portion 94 about a trigger swivel pin 96 as the trigger travels in the slot. The trigger portion 94 extends from the swivel pin 96 on the pan 90 through the slot in the flange 92 and as the trigger 20 extends into the space between the open trap arms 12, 14 the trigger consists of two flexible components 98 which may be bendable wire or the like. As the rolling block 72 becomes free of its engagement with the lock 64, the rolling block 72 is subject to rotary displacement about the trap arm 14, as is shown in FIGS. 5–7. The looseness of the rolling block 72 on the trap arm 14 augments action imposed by the game animal on the trigger 20 so that any of the above described displacements of the trigger causes the rolling block 72 to force or push the lock 64 for causing displacing or disengagement of the lock 64 from catch 70 and the trap 10 is triggered or fired, closing the trap arms 12, 14. This construction and arrangement provides that the animal must enter into the trap a distance sufficient to be in a predetermined most vulnerable position before the trap is "sprung".

A stop 100 on the hinging bracket 62 protrudes above the hinge pin 66 to restrain or stop the counterclockwise pivotal movement of the lock 64 from going overcenter responsive to the force of the spring 68 so that the lock 64 therefore is maintained in vertical position for reloading or setting the trap. When starting the trap arm 14 down in a backward and reloading movement, slide surfaces 74, 76 and 78 described above interface and subsequently the lock 64 is moved or forced outwardly until the downwardly facing edge 80 on the lock 64 moves into overlying engagement with the top edge 82 of the catch 70 with the gentle pressure applied by the spring 68 pushing the lock inwardly and causes the lock 64 to slip back over the catch 70, locking the lock 64 on the catch 70 and thus the trap 10 is set in its loaded position.

When setting the trap, the upper spring arm 46 and the loop 58 are moved downwardly and the loop 58 passes downwardly over the pivot bolt 18 and eyes 16 and 56 as shown in FIG. 1 by tensioning the double wrapped spring coil 50. The loop 58 is thus lowered until the trap arms 12, 14 completely pass through the loop, so the trap arms are capable of being horizontally positioned and set as described above. The loop 58 shown in FIGS. 1–4 is held in set position by straight power bars 42 of the trap arm 14 which in turn has the catch 70 mounted thereon securably engaging the lock 64 under the urging of the double wrapped spring 50. While the bolt 18 engages securely with the eyes of the power bars 42, the trap arm 12 is selectively positionable as shown in FIG. 2 for adjustment from wide-open to a semi-closed position for creating at the desire of the trapper a selected width for the trap.

When the trap 10 is triggered by an animal engaging with the trigger 20, the rolling block 72 displaces the lock 64 from the catch 70 and releases the force stored or retained in the double wrapped spring 50. The spring 50 urges the upper spring arm 46 and its loop 58 rapidly upward and the loop 58, contacting the power bars 42, shown in FIG. 5 drives the power bars 42 upwardly about bolt 18. FIG. 5 shows how the body 28 of an animal is drawn into the trap 10 as the bends 22, 26 and portion 24 start passing over the back of the body 28 forcing the trap 10 up and over the animal's back. Next, as the loop 58 moves further along the power bars 42, the portions 30, being more abrupt, encompass and continue forcing the body 28 into a constricted area, and the power bars 42 forced by the loop 58 thereon continue the closing upon the body 28 as portions 32 constrict the body as shown in FIG. 7 and form a five sided construction area. FIG. 7 illustrates how the portions 32, 42, and loop 58 form constriction elements upon the body 28. Also, the constriction area includes a small segment of portion 40 and demonstrates that the trap arms 12, 14 are used for small animals as the loop 58 rides upwardly along the power bar 42 and engages power stop 83 formed by the lower end of catch 70.

The embodiments disclosed in FIGS. 1–8 provide for a direct power applied to the trigger arrangement. In FIGS. 9–17 there is disclosed an embodiment with reduced power applied to the trigger arrangement. In both embodiments there is disclosed a three bar, five sided constriction of a body 28 as shown in FIGS. 5–7, and which causes a quicker death and secures the animal better than prior known traps because it applies constriction pressures all the way around the body 28 of the animal. All prior known traps apply pressure basically on two sides, by use of two bars engaging a body.

The side-mounted trigger 20 and trigger assembly 60 of the embodiments of FIGS. 1–8 maintain the trigger and assembly essentially free from debris and natural elements, as opposed to top mounted triggers in which the animal must go under the trigger to enter, or bottom mounted triggers which are quite susceptible to natural elements and debris. The automatic arrangement for the catch for resetting make it easier and quicker to set the trap in the field, and the trap can easily be loaded by hand without it being hazardous to any parts or limbs of one's own body, and the catch securely holds until triggered.

FIGS. 9–17 embody a trap 110 with a four-way reducing power trigger and includes trap arms 112, 114, trigger 120, loop 158, upper spring arm 146, lower spring arm 148, rolling block 172 having an upwardly extending catch 173, a pan 190, and an elongated bracket arm 200 securely attached to and extending upwardly from the lower spring arm 148. On the upper end of bracket arm 200 is an aligning block 202 shown in FIGS. 9–11 and having a semi-circular recess 204 for receiving the trap arm 114. Projecting from a side of the bracket arm 200 is a lock pivot 206 mounting a lock 210 which passes over and engages a holding pin 212 on the trap arm 114 for holding the trap arm 114 and pin 212 in a secure state when the lock is positioned so its pointed and terminal end 211 engages the inner surface of catch 173 adjacent a triangular slide face 220 on rolling block 172. The remaining structure is substantially the same as that shown in FIGS. 1–8.

The smaller trap model operates with a direct power trigger as embodied in FIGS. 1–8 of the drawings up to sizes for fox, coyote, or wolf. For larger animals, the wild game trap employs a reduced power trigger based on the lock 210 being approximately four or five times longer in front of the pin 212 than it is rearwardly of the holding pin 212, thereby reducing the trigger power four or five to one. This enables use of a much more powerful trap spring and still retain an easy moving trigger for larger animals.

When setting the trap 110, the trap arm 114 is pulled back into the aligning block 202 and the lock 210 is dropped over the holding pin 212 and hooked behind the catch 173 thus holding the rolling block 172 in position by the force from the lock 210. When pressure in any direction is applied to the trigger 120, the catch 173 on the rolling block 172 is caused to disengage from the pointed end 211 on lock 210 and release the trap. Release from an application of up pressure is shown in FIG. 14 where the up movement as illustrated by the arrow causes slide face 220 on the rolling block 172 to move end of lock 210 either right or left to release lock 210 from catch 173. Down pressure on the rolling block 172 illustrated in FIG. 15 causes the rolling block 172 to move downwardly so that catch 173 releases lock 210. An application of pressure to the right is shown in FIG. 16 which causes the rolling block to move right with respect to the lock 210 and left pressure applied as shown in FIG. 17 causes the rolling block to move to the left with respect to the lock 210. In summary, FIGS. 14–17 show the catch 173 on the rolling block 172 and the slide surface 220 relative to the pointed end 211 of the lock 210 when releasing the lock 210 in response to movement of the trigger 120 and rolling block 172 in various directions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wild game trap comprising a pair of multiangulated trap arms each mounted for rotation about pivot means, power spring means acting against said trap arms at points spaced from the pivot means to urge the trap arms toward animal gripping position, and trigger means extending between the trap arms and including an assembly engaging at least one of the trap arms to retain the trap arms in open, animal receiving, set position against the action of the spring means, said assembly being released from the trap arm in response to movement of the trigger means in multidirections, said spring means including a constriction bar means together with the pair of multiangulated trap arms cooperating in entrapment of the animal, each said trap arms also performing as a constriction bar means, each of the multiangulated trap arms including a straight segment defining a locking and power bar engaged by the spring means, a first portion applying initial force on an animal's back, a second portion continuing to apply force on the animal's back and adjacent sides as the trap arms cross over each other, said spring means providing efficient leverage on the locking and power bars of the multiangulated trap arms and forming one side of a five sided constriction area for the wild game animal trap.

2. The invention of claim 1 wherein said trigger means is supportively mounted on one of the trap arms.

3. The invention of claim 2 wherein said trigger means includes a pan, triggers mounted on the pan, said assembly including a catch, a lock and spring means for urging the lock into engagement with the catch.

4. An animal trap comprising a pair of generally right angular trap arms having generally upwardly extending portions and horizontal inwardly extending portions when the trap arms are in set position, means pivotally supporting the trap arms for inward swinging movement about the inner end of the horizontal portions and crossing of the upper ends of the upwardly extending portions when the trap arms move toward an animal gripping position, spring means engaging at least one of the trap arms to urge the trap arms toward animal gripping position, and trigger means releasably retaining the trap arms in set position against the force exerted by said spring means, said trigger means including a hollow block loosely encircling and thus being mounted on one of trap arms with movement of the block in any direction in relation to the trap arm releasing the trap arms for movement toward each other.

5. The trap as defined in claim 4 wherein said trap arm having the hollow block thereon includes an upwardly facing surface forming a catch, a lock movably supported from said spring means and including a downwardly facing surface biased into engagement with the catch on the trap arm, said block including a surface engaging the lock for forcing the downwardly facing surface off the catch when the trigger means is engaged by an animal and the block is moved about the trap arm thereby permitting the spring means to close the trap arms onto the animal.

6. The trap as defined in claim 4 wherein said trigger means includes a locking assembly including an upwardly extending bracket, a lock pivotally mounted on said bracket and engaging an upwardly facing catch on the trap arm having the hollow block mounted thereon, said hollow block engaging the lock with movement of the hollow block when the trigger means is moved by an animal releasing the lock thereby permitting the trap arms to grip the animal.

7. The trap as defined in claim 4 wherein said trap arm enagaged by the spring means includes a stop thereon to limit movement of the spring means, said spring means including a bar extending across the bottom of the constricton area defined by said arms when in animal gripping position to constrict the underside of an animal gripped by the arms and cooperating with the arms to form a five sided constriction area.

8. The trap as defined in claim 5 wherein said lock is supported by a bracket attached to the spring means, said downwardly facing surface being biased into overlying engagement with the upwardly facing surface on the trap arm by spring means.

9. The trap as defined in claim 8 wherein said spring means biasing the lock includes, a hinge pin pivotally connecting the lock to the bracket, said spring means urging the lock toward locked position.

10. The trap as defined in claim 8 wherein said spring means biasing the lock include said bracket and lock being of one-piece construction and having a reduced cross-sectional connecting area of flexible resilient material to bias the lock toward locked position.

11. The trap as defined in claim 4 wherein said trap arm having the hollow block thereon includes a laterally extending pin above said hollow block, an upwardly extending bracket on the spring means, a lock pivotally mounted from the upper end portion of the bracket and extending over the pin when the trap arms are in set position, and means on the hollow block engaged by the free end of the lock to retain the trap arms in set position with movement of the hollow block releasing the lock and permitting the trap arms to move toward each other.

12. A trap comprising a pair of trap arms, each trap arm having one end pivotally supported for swinging movement of the trap arms between a set position with the other ends of the arms being spaced apart and a closed position with the other ends of the arms in overlapping relation to form a constriction area, spring means engaging said arms biasing them toward closed position, latch means engaged with one of said arms for retaining said arms in set position against the bias of said spring means, and trigger means engaged with said latch means and extending into the area between the arms when the arms are in set position, said trigger means moving said latch means to release said trap arms whereby said spring means will move said trap arms toward closed position, said trigger means being moved in response to positioning of a body between the trap arms when in set position with the body contacting and moving the trigger means to release the latch means, each of said trap arms being angulated and including a generally horizontal portion and a generally upstanding portion when the trap arms are in set position, said spring means including a loop underlying the horizontal portions of the arms when the arms are in set position, said loop moving upwardly in encircling relation to the horizontal portions of the arms as they pivot toward an upstanding position with the loop forming one side of the constriction area with the other sides of the constriction area being formed by the horizontal portions and upstanding portions of the trap arms as they swing toward closed position thereby forming a five sided constriction area, said one of said trap arms including an upwardly facing latch surface, said latch means including a pivotally supported lock member having a downwardly facing lock surface releasably engaged with said upwardly facing latch surface, said trigger means including block means movably mounted on said trap arm having the upwardly facing latch surface thereon and in engagement with the lock member to disengage the lock member from the latch surface upon movement of the block means in any angular direction.

13. The trap as defined in claim 12 wherein said block means includes a block having an opening therethrough loosely receiving said trap arm to enable relative movement of the block in any angular relation to the trap arm, said trigger means including a trigger member extending from said block into the area between the upstanding portions of the arms when in set position, said block and lock member having flat engaging surfaces whereby tilting of the block in any angular direction will release the lock member from the latch surface.

* * * * *